UNITED STATES PATENT OFFICE.

EDWARD J. DE SMEDT, OF WASHINGTON, DISTRICT OF COLUMBIA.

MANUFACTURE OF PORTLAND CEMENT.

SPECIFICATION forming part of Letters Patent No. 274,734, dated March 27, 1883.

Application filed February 9, 1883. (No specimens.)

*To all whom it may concern:*

Be it known that I, EDWARD J. DE SMEDT, of the city of Washington, District of Columbia, have invented a new and useful Improvement in the Manufacture of Portland Cement, of which the following is a specification.

Portland cement, in rare instances, is made from natural rocks, wherein have been found the requisite ingredients combined in proper proportions; but usually it is manufactured from chalk and clay by the "wet" process or the "dry" process, both of which processes of manufacture are well known to those skilled in this industry, the manufactured article, by chemical analysis, ordinarily containing about thirty per cent. of silica and alumina and seventy per cent. of lime and magnesia, together with small and varying percentages of oxide of iron, potash, sulphuric acid, &c. This method of manufacturing Portland cement is extensively carried on in Europe. Attempts have been made in this country to employ the same method; but owing to the difficulty of finding clay and chalk or carbonate of lime containing the proper ingredients in proper form in such proximity to one another as to admit of economical working, these attempts have not been attended with pecuniary success.

Argillo-magnesian and argillo-calcareous cement-rocks and hydraulic limestones are found quite abundantly both in this country and in Europe, and have been used extensively for the manufacture of cement; but although containing silica, alumina, magnesia, and lime, and other ingredients they are ineffective in themselves to produce Portland cement, the cement made from them being common cement—such, for instance, as the cements known in the market as "Cumberland cement," "Rosendale cement," &c.

It has been my object to devise some way of utilizing these rocks for the manufacture of Portland cement. I have ascertained that while adapted in other respects to this manufacture they are deficient for that purpose in the amount of lime they contain; and I have discovered that by combining with them lime in sufficient quantity to bring the percentage of this ingredient in the compound up to about seventy per cent. this difficulty is completely obviated, and a cement can be produced having all the characteristics and qualities of the best Portland cement. The value of this discovery is enhanced by the fact that, as a general rule, wherever a cement-rock or hydraulic limestone formation occurs there are also to be found rocks capable of producing lime, so that I can obtain on the spot all the ingredients required for the manufacture of the article, thus obviating the great obstacle which has heretofore laid in the way of the successful production of Portland cement in an industrial way.

I may say, further, that by my invention a more regular, accurate, and better Portland cement can be produced than by the methods now in use, and a very considerable saving in money and labor is effected.

One way in which I carry my invention into practical effect is as follows: I take the cement-rocks or the hydraulic limestones, or both, and grind them up raw. I ascertain, by analysis, the chemical composition of the ground mass, with a view to determine the extent to which it is deficient in lime, and I then add to the mass lime in such proportion as to make the manufactured Portland cement analyze about seventy per cent. (or, say, from fifty-five or sixty to seventy per cent.) of lime, or lime and magnesia. After the addition and incorporation of the lime the powdered or ground mass is moistened, made into bricks or other forms, dried, calcined to a clinker, and ground into cement under either the wet process or the dry process, as preferred; or, if desired, it may be made into cement in accordance with the process described in my Letters Patent bearing date of March 20, 1883, the characteristic of said patented process residing in the mixture with the cement paste before calcination of a hydrocarbon or other combustible.

I have stated that the ingredient which I add to the ground rock is lime. By the term "lime" I intend and mean lime which will slake in water, either hydrated or anhydrous, or in the form of a carbonate, which, after calcination, will slake in water. I on the whole prefer to use slaked lime, on the score of convenience and for other reasons.

I can also make and have made Portland cement from ordinary natural cement—such as Rosendale cement and Cumberland cement—by adding to them lime in the proportion hereinbefore indicated and then moistening the mass, making it into bricks or other forms, recalcining the same to clinker, and then grinding the calcined product. I have also made Portland cement from these ordinary natural cements by first recalcining the latter to clinker and then regrinding and adding lime in the proportion hereinbefore indicated. The Portland cement thus obtained is, however, more slow-setting than that obtained by adding lime to the mass before calcination.

I desire it to be understood that I intend to include within the terms of my claims all of the foregoing recited methods of applying and using cement-rocks or hydraulic limestones, whether raw or in the condition of cements, for the purpose of producing a Portland cement.

Having now described my invention and the best way known to me of carrying the same into practical effect, I state my claims as follows:

1. The improvement in the art of manufacturing Portland cement, consisting in combining with cement-rocks or hydraulic limestones, either before or after the calcining operation, lime in substantially the proportions stated.

2. The improvement in the art of manufacturing Portland cement, consisting in combining with cement-rocks or hydraulic limestones, either before or after the calcining operation, slaked lime in substantially the proportions stated.

3. The process of manufacturing Portland cement, consisting in combining with ground or pulverized cement-rocks or hydraulic limestones, lime in substantially the proportions stated, and subsequently calcining and grinding said compounds, substantially as hereinbefore set forth.

4. The hereinbefore-described product obtained from the combination, substantially in the manner set forth, of cement-rocks or hydraulic limestones with lime, in substantially the proportions stated.

In testimony whereof I have hereunto set my hand this 8th day of February, 1883.

E. J. DE SMEDT.

Witnesses:
J. WALTER BLANDFORD,
EWELL A. DICK.